（12）United States Patent
Shen et al.

(10) Patent No.: US 12,277,338 B1
(45) Date of Patent: Apr. 15, 2025

(54) SYSTEMS AND METHODS OF UPDATING SPARSE METADATA IN METADATA DELTA LOG (MDL)-BASED STORAGE CLUSTERS

(71) Applicant: Dell Products L.P., Round Rock, TX (US)

(72) Inventors: Seman Shen, Shanghai (CN); Vladimir Shveidel, Pardes Hana-Karkur (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/530,668

(22) Filed: Dec. 6, 2023

(51) Int. Cl.
G06F 3/06 (2006.01)
(52) U.S. Cl.
CPC ............ G06F 3/065 (2013.01); G06F 3/0604 (2013.01); *G06F 3/0679* (2013.01)
(58) Field of Classification Search
CPC ....... G06F 3/065; G06F 3/0604; G06F 3/0679
See application file for complete search history.

(56) References Cited

U.S. PATENT DOCUMENTS

| | | | |
|---|---|---|---|
| 9,268,502 B2 * | 2/2016 | Zheng | G06F 3/0665 |
| 11,042,296 B1 | 6/2021 | Shveidel et al. | |
| 11,347,725 B2 | 5/2022 | Shveidel et al. | |
| 11,487,706 B2 | 11/2022 | Shveidel et al. | |
| 11,726,663 B2 | 8/2023 | Shveidel et al. | |
| 11,797,525 B2 | 10/2023 | Shveidel et al. | |
| 11,868,256 B2 | 1/2024 | Love et al. | |
| 2019/0171738 A1* | 6/2019 | Cai | G06F 16/248 |
| 2021/0216531 A1* | 7/2021 | Shveidel | G06F 16/2365 |
| 2021/0334003 A1* | 10/2021 | Agrawal | G06F 3/067 |
| 2022/0221992 A1* | 7/2022 | Shveidel | G06F 3/061 |
| 2022/0414086 A1* | 12/2022 | Shveidel | G06F 3/067 |
| 2023/0342079 A1* | 10/2023 | Shveidel | G06F 3/0656 |

* cited by examiner

*Primary Examiner* — Jason W Blust
(74) *Attorney, Agent, or Firm* — BainwoodHuang

(57) ABSTRACT

Techniques for updating sparse metadata in a metadata delta log (MDL)-based storage system. The techniques include providing a 3-level MDL, which includes a first level for a first set of buckets initially (and temporarily) designated as "active", a second level for a second set of buckets initially (and temporarily) designated as "de-staging", and a third level for a third set of buckets designated as "base". The techniques include receiving delta updates of space accounting (SA) statistics at buckets of the active set, in which the SA statistics are associated with IDs from a large sparse ID space. The techniques include, once the buckets of the active set are full, switching the "active" and "de-staging" designations of the first and second sets of buckets, respectively, and de-staging and merging, bucket-by-bucket, the SA delta updates contained in the de-staging set with any SA delta updates contained in the base set.

20 Claims, 10 Drawing Sheets

SYSTEMS AND METHODS OF UPDATING SPARSE METADATA IN METADATA DELTA LOG (MDL)-BASED STORAGE CLUSTERS

BACKGROUND

Storage systems include storage processors coupled to arrays of storage devices (or "storage array(s)") such as magnetic disk drives, electronic flash drives, and/or optical drives. The storage processors are configured to service storage input/output (IO) requests received from client computers, which send the storage IO requests to the storage systems over one or more networks. The storage IO requests specify data or metadata (MD)) pages, blocks, files, or other data or MD elements to be written to, read from, created on, and/or deleted from volumes (VOLs), logical units (LUs), filesystems, or other storage objects stored on the storage devices. Software application programs running on the storage processors manage the received storage IO requests, and perform various processing tasks for organizing and/or securing the data or MD elements on the storage devices, as well as collecting space accounting (SA) statistics pertaining to space usage on the storage devices. The client computers refer to the collected SA statistics to determine needs to extend, release, or reclaim storage space, thereby assuring availabilities of the storage systems.

SUMMARY

Having collected SA statistics affecting space usage on one or more storage devices, a storage system can write the SA statistics to one or more MD pages, and store the MD pages to an MD page store on a storage array. The SA statistics for a storage object (e.g., a volume), a snapshot (or "snap") of a volume, a snap group, and so on, can be associated with a unique SA identifier (SA-ID), which can be derived from an identifier (ID) of the volume, the snap, the snap group, and so on. As storage IO requests are processed at the storage system, the SA statistics for the volume, the snap, the snap group, and so on, can be updated, often at a high rate. Such an approach to collecting SA statistics for storage objects and writing them to MD pages can have drawbacks, however, due to the SA statistics being associated with SA-IDs from a large sparse ID space. If such SA-IDs were mapped to logical addresses of MD pages, then the MD page store would likely require a large address space to accommodate many sparse SA-ID values. However, such a large address space of the MD page store may be much larger than the physical address space of the storage array, causing significant processing difficulties and inefficiencies within the storage system.

Techniques are disclosed herein for updating sparse metadata in a metadata delta log (MDL)-based storage system. The disclosed techniques can be employed in a storage system having a delta log-based architecture, such as a storage node of a clustered storage system (or "storage cluster"). In the disclosed techniques, the delta log-based architecture can include a 3-level MDL implemented in volatile memory, and a journal (or "raw delta log (RDL)") implemented in persistent memory. The 3-level MDL can include a first level for a first set of logical data containers (or "buckets") initially (and temporarily) designated as "active", a second level for a second set of buckets initially (and temporarily) designated as "de-staging", and a third level for a third set of buckets designated as "base". The disclosed techniques can include receiving delta updates of space accounting (SA) statistics (or "SA delta updates") at one or more buckets of the active set, and maintaining copies of the SA delta updates in the RDL. In the disclosed techniques, the SA statistics can be associated with SA-IDs from a large sparse ID space. The disclosed techniques can include, once one, some, or all buckets of the active set are full (or the RDL is full), switching the "active" and "de-staging" designations of the first and second sets of buckets, respectively, thereby designating the first set as the "de-staging" set and the second set as the "active" set. The disclosed techniques can include merging, bucket-by-bucket, the SA delta updates contained in the newly designated de-staging set with any SA delta updates contained in the base set, and maintaining copies of the merged SA delta updates contained in the base set in a data segment (or "trunk") stored on a storage device of a storage array.

At a desired or appropriate time, the disclosed techniques can include reading the SA delta updates contained in the 3-level MDL. In the disclosed techniques, the reading of the SA delta updates can include, if the SA delta updates contained in the de-staging set have been fully or completely merged with the SA delta updates contained in the base set, (i) merging, bucket-by-bucket, the SA delta updates contained in the active set with the SA delta updates contained in the base set, and (ii) reading the resulting merged SA delta update information. The reading of the SA delta updates can further include, if one or more SA delta updates contained in the de-staging set have not been merged with the SA delta updates contained in the base set, (i) merging, bucket-by-bucket, the one or more SA delta updates contained in the de-staging set with the SA delta updates contained in the base set to obtain first merged SA delta update information, (ii) merging, bucket-by-bucket, the SA delta updates contained in the active set with the first merged SA delta update information to obtain second merged SA delta update information, and (iii) reading the second merged SA delta update information. The disclosed techniques can include, in response to a disaster, system panic, data loss, data corruption, power failure, and so on, recovering the SA delta updates for the active and de-staging sets of buckets from the RDL, and recovering the SA delta updates for the base set of buckets from the data trunk stored on the storage device of the storage array. By providing a 3-level MDL for logging and maintaining delta updates of SA statistics, in which the SA statistics are associated with SA-IDs from a large sparse ID space. SA delta updates can be written and read in a manner that can be performed with increased efficiency, using reduced amounts of processing and memory resources.

In certain embodiments, a method includes providing a 3-level metadata delta log (MDL) including a first level for a first set of logical data containers designated as an "active" set, a second level for a second set of logical data containers designated as a "de-staging" set, and a third level for a third set of logical data containers designated as a "base" set. The base set of logical data containers contains a base set of space accounting (SA) statistics pertaining to logical and/or physical storage space used by storage objects on a storage system. The SA statistics are associated with sparse SA identifier (SA-ID) values. The method includes receiving delta updates of the SA statistics at the active set of logical data containers, and, once one, some, or all of the active set of logical data containers are full, switching the "active" and "de-staging" designations of the first and second sets of logical data containers, respectively. The method includes merging, logical data container-by-logical data container, at least some of the delta updates of SA statistics contained in the de-staging set with the base set of SA statistics to obtain first merged SA statistics, and reading at least some of the first merged SA statistics.

In certain arrangements, the method includes determining that the delta updates of SA statistics contained in the de-staging set have been fully or completely merged with the base set of SA statistics, merging, logical data container-by-logical data container, the delta updates of SA statistics contained in the active set with the first merged SA statistics to obtain second merged SA statistics, and reading at least some of the second merged SA statistics.

In certain arrangements, the method includes determining that one or more delta updates of SA statistics contained in the de-staging set have not been merged with the base set of SA statistics, merging, logical data container-by-logical data container, the one or more delta updates of SA statistics contained in the de-staging set with the first merged SA statistics to obtain second merged SA statistics, merging, logical data container-by-logical data container, the delta updates of SA statistics contained in the active set with the second merged SA statistics to obtain third merged SA statistics, and reading at least some of the third merged SA statistics.

In certain arrangements, the method includes writing copies of the delta updates of the SA statistics received at the active set of logical data containers to an active area of a raw delta log (RDL) in persistent memory. The RDL includes a de-staging area containing copies of delta updates of SA statistics contained in the de-staging set of logical data containers.

In certain arrangements, the method includes, in response to a predetermined event, reconstructing the delta updates of the SA statistics contained in the active set of logical data containers by applying the copies of the delta updates of the SA statistics from the active area of the RDL to the active set of logical data containers.

In certain arrangements, the method includes, in response to the predetermined event, reconstructing the delta updates of the SA statistics contained in the de-staging set of logical data containers by applying the copies of the delta updates of the SA statistics from the de-staging area of the RDL to the de-staging set of logical data containers.

In certain arrangements, the method includes maintaining copies of the base set of SA statistics contained in the base set of logical data containers in a sequence of records stored in a persistent data segment.

In certain arrangements, the method includes, in response to the predetermined event, reconstructing the base set of SA statistics by applying the copies of the base set of SA statistics from the sequence of records in the persistent data segment to the base set of logical data containers.

In certain arrangements, the method includes maintaining metadata information indicating a point in the de-staging set where delta updates of SA statistics from a last logical data container were merged with the base set of SA statistics before the predetermined event. The method includes, having reconstructed the delta updates of the SA statistics contained in the de-staging set of logical data containers, de-staging, logical data container-by-logical data container, the reconstructed delta updates of SA statistics from the de-staging set to the base set up to the point indicated by the metadata information, and recovering SA statistics for remaining logical data containers in the base set from the sequence of records in the persistent data segment.

In certain embodiments, a system includes a 3-level metadata delta log (MDL). The 3-level MDL includes a first level for a first set of logical data containers designated as an "active" set, a second level for a second set of logical data containers designated as a "de-staging" set, and a third level for a third set of logical data containers designated as a "base" set. The base set of logical data containers contains a base set of space accounting (SA) statistics pertaining to logical and/or physical storage space used by storage objects on a storage system. The SA statistics are associated with sparse SA identifier (SA-ID) values. The system includes a memory, and processing circuitry configured to execute program instructions out of the memory to receive delta updates of the SA statistics at the active set of logical data containers, once one, some, or all of the active set of logical data containers are full, to switch the "active" and "de-staging" designations of the first and second sets of logical data containers, respectively, to merge, logical data container-by-logical data container, at least some of the delta updates of SA statistics contained in the de-staging set with the base set of SA statistics to obtain first merged SA statistics, and to read at least some of the first merged SA statistics.

In certain arrangements, the processing circuitry is configured to execute the program instructions out of the memory to determine that the delta updates of SA statistics contained in the de-staging set have been fully or completely merged with the base set of SA statistics, to merge, logical data container-by-logical data container, the delta updates of SA statistics contained in the active set with the first merged SA statistics to obtain second merged SA statistics, and to read at least some of the second merged SA statistics.

In certain arrangements, the processing circuitry is configured to execute the program instructions out of the memory to determine that one or more delta updates of SA statistics contained in the de-staging set have not been merged with the base set of SA statistics, to merge, logical data container-by-logical data container, the one or more delta updates of SA statistics contained in the de-staging set with the first merged SA statistics to obtain second merged SA statistics, to merge, logical data container-by-logical data container, the delta updates of SA statistics contained in the active set with the second merged SA statistics to obtain third merged SA statistics, and to read at least some of the third merged SA statistics.

In certain arrangements, the processing circuitry is configured to execute the program instructions out of the memory to write copies of the delta updates of the SA statistics received at the active set of logical data containers to an active area of a raw delta log (RDL) in persistent memory. The RDL includes a de-staging area containing copies of delta updates of SA statistics contained in the de-staging set of logical data containers.

In certain arrangements, the processing circuitry is configured to execute the program instructions out of the memory, in response to a predetermined event, to reconstruct the delta updates of the SA statistics contained in the active set of logical data containers by applying the copies of the delta updates of the SA statistics from the active area of the RDL to the active set of logical data containers.

In certain arrangements, the processing circuitry is configured to execute the program instructions out of the memory, in response to the predetermined event, to reconstruct the delta updates of the SA statistics contained in the de-staging set of logical data containers by applying the copies of the delta updates of the SA statistics from the de-staging area of the RDL to the de-staging set of logical data containers.

In certain arrangements, the processing circuitry is configured to execute the program instructions out of the memory to maintain copies of the base set of SA statistics contained in the base set of logical data containers in a sequence of records stored in a persistent data segment.

In certain arrangements, the processing circuitry is configured to execute the program instructions out of the memory, in response to a predetermined event, to reconstruct the base set of SA statistics by applying the copies of the base set of SA statistics from the sequence of records in the persistent data segment to the base set of logical data containers.

In certain arrangements, each of the sparse SA-ID values is configured to identify a respective one of the storage objects on the storage system.

In certain embodiments, a computer program product includes a set of non-transitory, computer-readable media having instructions that, when executed by processing circuitry, cause the processing circuitry to perform a method including providing a 3-level metadata delta log (MDL) including a first level for a first set of logical data containers designated as an "active" set, a second level for a second set of logical data containers designated as a "de-staging" set, and a third level for a third set of logical data containers designated as a "base" set. The base set of logical data containers contains a base set of space accounting (SA) statistics pertaining to logical and/or physical storage space used by storage objects on a storage system. The SA statistics are associated with sparse SA identifier (SA-ID) values. The method includes receiving delta updates of the SA statistics at the active set of logical data containers, once one, some, or all of the active set of logical data containers are full, switching the "active" and "de-staging" designations of the first and second sets of logical data containers, respectively, merging, logical data container-by-logical data container, at least some of the delta updates of SA statistics contained in the de-staging set with the base set of SA statistics to obtain first merged SA statistics, and reading at least some of the first merged SA statistics.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

FIG. 2b is a block diagram of an exemplary random access memory (RAM) cache and an exemplary nonvolatile RAM (NVRAM) included in the storage node of FIG. 2a, in which the RAM cache is configured to accommodate the 3-level MDL of FIG. 2a, and the NVRAM is configured to accommodate the RDL of FIG. 2a;

FIG. 5d is a block diagram of an exemplary workflow for performing a recovery of the 3-level MDL of FIG. 2a from a disaster, system panic, data loss, data corruption, power failure, and so on.

DETAILED DESCRIPTION

Techniques are disclosed herein for updating sparse metadata in a metadata delta log (MDL)-based storage system. The disclosed techniques can include providing a 3-level MDL, which can include a first level for a first set of logical data containers (or "buckets") initially (and temporarily) designated as "active", a second level for a second set of buckets initially (and temporarily) designated as "de-staging", and a third level for a third set of buckets designated as "base". The disclosed techniques can include receiving delta updates of space accounting (SA) statistics (or "SA delta updates") at buckets of the active set, in which the SA statistics are associated with SA-IDs from a large sparse ID space. The disclosed techniques can include, once one, some, or all buckets of the active set are full, switching the "active" and "de-staging" designations of the first and second sets of buckets, respectively, and de-staging and merging, bucket-by-bucket, the SA delta updates contained in the newly designated de-staging set with any SA delta updates contained in the base set. By providing the 3-level MDL for logging and maintaining delta updates of SA statistics, in which the SA statistics are associated with SA-IDs from a large sparse ID space, the writing and reading of SA delta updates can be performed with increased efficiency, using reduced amounts of processing and memory resources.

Figure 1:
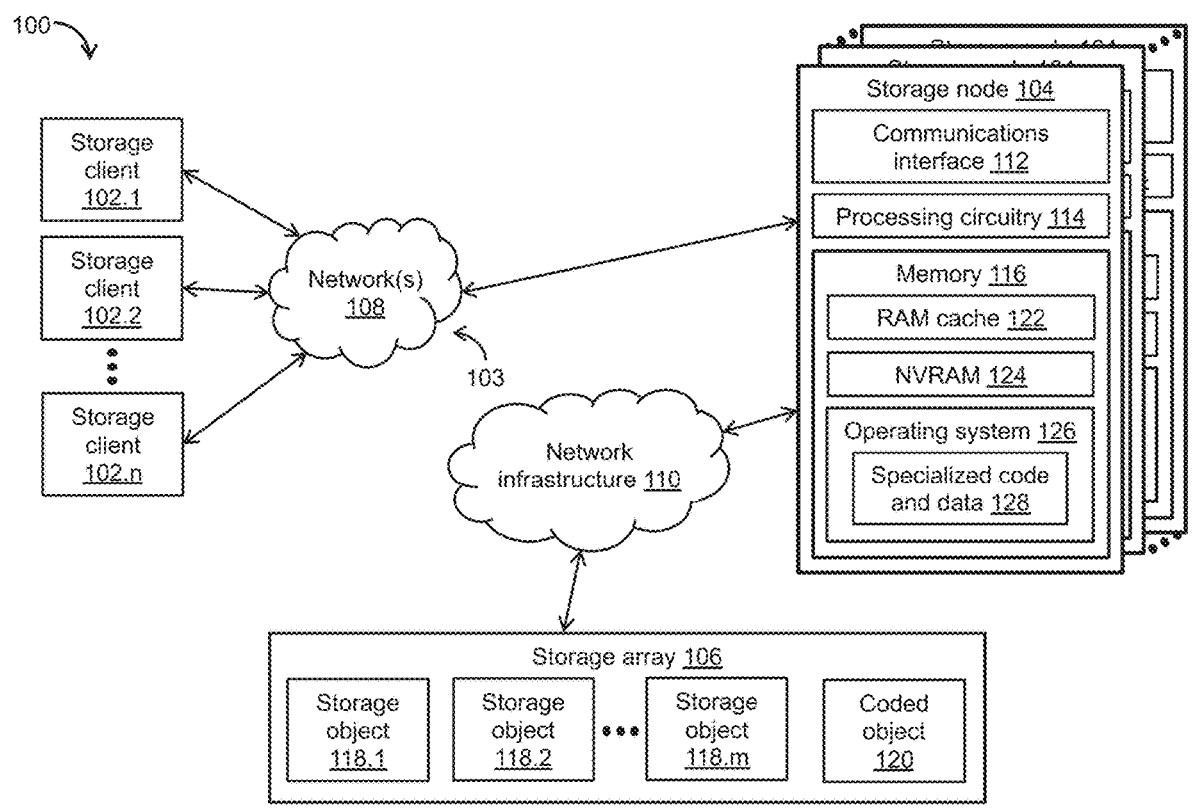
FIG. 1 is a block diagram of an exemplary storage environment, in which techniques can be practiced for performing sparse metadata updates in a metadata delta log (MDL)-based storage system, in which the MDL-based storage system is configured as a storage node of a storage cluster.

FIG. 1 depicts an illustrative embodiment of an exemplary storage environment 100, in which techniques can be practiced for updating sparse metadata in a metadata delta log (MDL)-based storage system. As shown in FIG. 1, the storage environment 100 can include a plurality of storage client computers (or "storage clients") 102.1, 102.2, . . . , 102.n, two or more storage processors (or "storage nodes") such as a storage node 104, a storage array 106, and a communications medium 103 that includes at least one network 108. The plurality of storage clients 102.1, . . . , 102.n can be configured to provide, over the network(s) 108, storage input/output (IO) requests (e.g., small computer system interface (SCSI) commands, network file system (NFS) commands) to the storage node 104. Such storage IO requests (e.g., write requests, read requests) can direct the storage node 104 to write and/or read data or metadata (MD) pages, blocks, files, or any other suitable data or MD objects to/from volumes (VOLs), logical units (LUs), filesystems, or any other suitable storage objects, such as storage objects 118.1, 118.2, . . . , 118.*m* maintained in the storage array 106.

The communications medium 103 can be configured to interconnect the plurality of storage clients 102.1, . . . , 102.*n* with the storage node 104 to enable them to communicate and exchange data and control signaling. As shown in FIG. 1, the communications medium 103 can be illustrated as a "cloud" to represent different network topologies, such as storage area network (SAN) topologies, network attached storage (NAS) topologies, local area network (LAN) topologies, metropolitan area network (MAN) topologies, wide area network (WAN) topologies, and so on. As such, the communications medium 103 can include copper-based data communications devices and cabling, fiber optic devices and cabling, wireless devices, and so on, or any suitable combination thereof.

The storage node 104 can be connected directly to the storage array 106 or via a network infrastructure 110, which can include an Ethernet network, an InfiniBand network, a fiber channel network, and/or any other suitable network. As shown in FIG. 1, the storage node 104 can include a communications interface 112, processing circuitry 114, and a memory 116. The communications interface 112 can include one or more of an Ethernet interface, an InfiniBand interface, a fiber channel interface, and/or any other suitable interface. The communications interface 112 can further include SCSI target adapters, network interface adapters, and/or any other suitable adapters for converting electronic, optical, and/or wireless signals received over the network(s) 108 to a form suitable for use by the processing circuitry 114.

The memory 116 can include volatile memory such as a random-access memory (RAM) cache 122 or any other suitable volatile memory, as well as persistent memory such as a nonvolatile RAM (NVRAM) 124 or any other suitable persistent memory. The memory 116 can store a variety of software constructs realized in the form of specialized code and data 128 (e.g., program instructions), which can be executed by the processing circuitry 114 to carry out the techniques and/or methods disclosed herein. The memory 116 can further include an operating system 126 such as a Linux operating system (OS), Unix OS, Windows OS, or any other suitable OS. The processing circuitry 114 can include one or more physical storage processors or cores configured to execute the specialized code and data 128 out of the memory 116, process storage IO requests (e.g., write requests, read requests) issued by the storage clients 102.1, . . . , 102.*n*, and store data or metadata to the storage array 106 within the storage environment 100, which can be a clustered RAID environment.

As shown in FIG. 1, the storage array 106 can include a coded object 120, which can be configured to store coded data for use in rebuilding lost or corrupted data or metadata on one or more of the storage objects 118.1, . . . , 118.*m*. In one embodiment, the coded object 120 can be stored to a hard disk drive (HDD) configured to store parity data in a RAID array. Alternatively, or in addition, the storage objects 118.1, . . . , 118.*m* and the coded object 120 can be stored to one or more HDDs, solid-state drives (SSDs), flash devices, or any other suitable storage device(s). It is noted that the storage node 104 can include a keyboard, a mouse, and/or any other suitable IO module or device, an uninterruptable power supply (UPS), and/or any other suitable modules, devices, and/or components.

In the context of the processing circuitry 114 being implemented using one or more storage processors or cores executing the specialized code and data 128 (e.g., program instructions), a computer program product can be configured to deliver all or a portion of the specialized code and data 128 to the storage processors or cores. Such a computer program product can include one or more non-transient computer-readable storage media, such as a magnetic disk, a magnetic tape, a compact disk (CD), a digital versatile disk (DVD), an optical disk, a flash drive, a solid-state drive (SSD), a secure digital (SD) chip or device, an application specific integrated circuit (ASIC), a field programmable gate array (FPGA), and so on. Further, the non-transient computer-readable storage media can be encoded with sets of program instructions for performing, when executed by the respective storage processors or cores, the various techniques and/or methods disclosed herein.

Figure 2A:
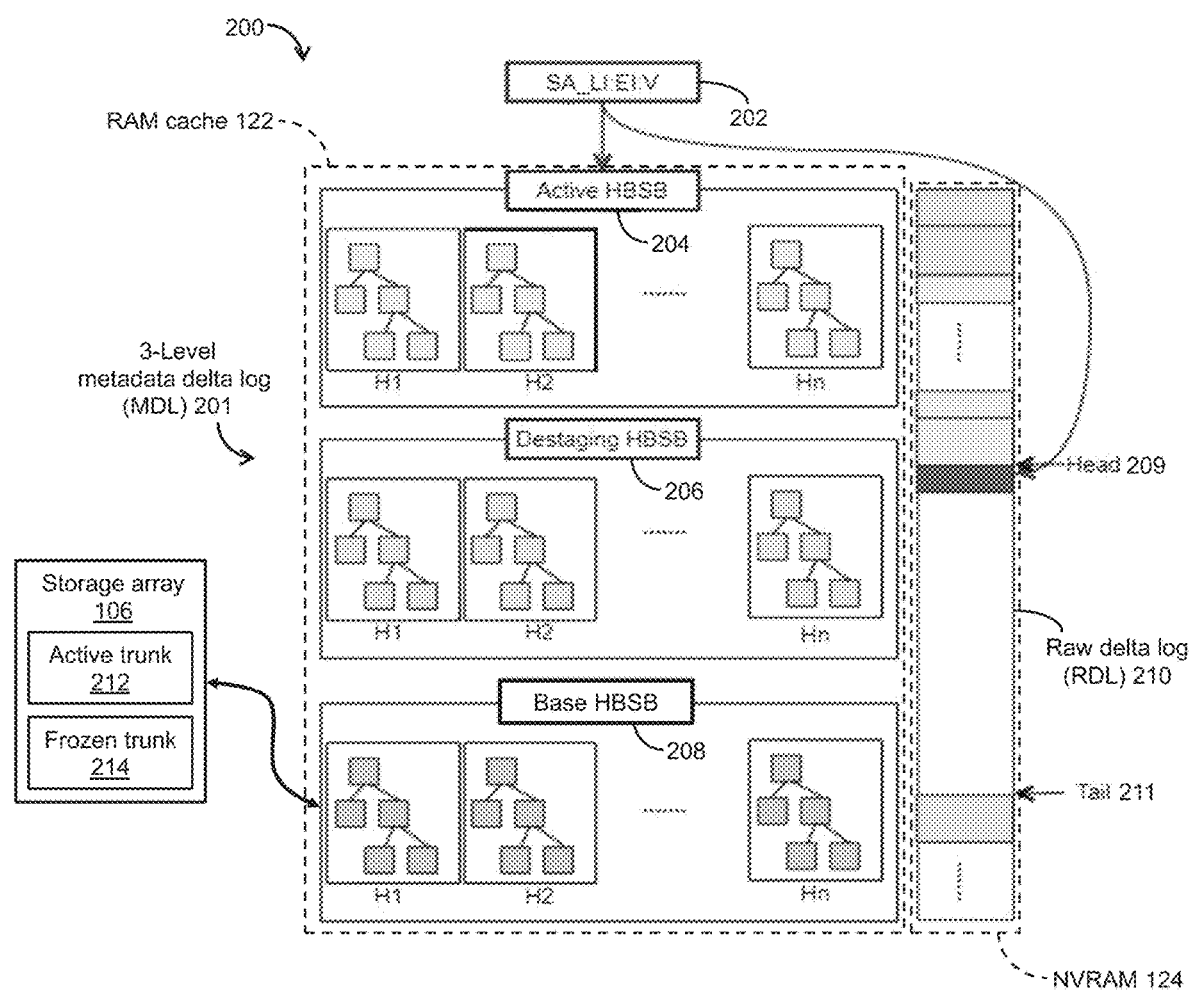
FIG. 2a is a block diagram of an exemplary delta log-based architecture of the storage node of FIG. 1, in which the delta log-based architecture includes a 3-level MDL and a raw delta log (RDL)

FIG. 2*a* depicts an exemplary delta log-based architecture 200 of the storage node 104 (see FIG. 1), in which the delta log-based architecture 200 includes a 3-level MDL 201 and a journal (or "raw delta log (RDL)") 210. As shown in FIG. 2*a*, the 3-level MDL 201 can include three levels of MDLs implemented in the RAM cache 122, namely, a first level for a first set 204 of logical data containers (or "buckets") initially (and temporarily) designated as "active", a second level for a second set 206 of buckets initially (and temporarily) designated as "de-staging", and a third level for a third set 208 of buckets designated as "base". The first (or "active") set 204 can include a plurality of buckets, $H_1, H_2, \ldots, H_N$, in which "N" can be any suitable positive integer. Likewise, the second (or "de-staging") set 206 can include a plurality of buckets, $H_1, H_2, \ldots, H_N$, and the third (or "base") set 208 can include a plurality of buckets, $H_1, H_2, \ldots, H_N$, in which "N" can be any suitable positive integer. In one embodiment, the plurality of buckets $H_1, H_2, \ldots, H_N$ included in each of the first, second, and third sets 204, 206, 208 can be configured as hash-based sorted buckets (HBSBs). Each of the buckets $H_1, H_2, \ldots, H_N$ included in the first, second, and third sets 204, 206, 208 can be configured to store delta updates of space accounting (SA) statistics (or "SA delta updates") pertaining to logical and/or physical storage space used by storage objects (e.g., volumes (VOLs)), snapshots (or "snaps") of VOLs, snap groups, and so on. The storage clients 102.1, . . . , 102.*n* (see FIG. 1) can refer to such SA statistics to determine needs to extend, release, or reclaim storage space, thereby assuring an availability of the storage node 104. In one embodiment, each bucket $H_1, H_2, H_3, \ldots, H_N$ can be configured as a tree data structure, such as a b-tree with multiple levels of nodes (e.g., top, mid, leaf) or any other suitable data structure. As described herein, the processing circuitry 114 can process storage IO requests (e.g., write requests, read requests) issued by the storage clients 102.1, . . . , 102.*n* to write/read data or metadata to/from storage devices on the storage array 106. Such metadata can include updates to SA deltas, which can specify pending changes to SA delta values at leaf levels of b-trees implemented by the respective buckets $H_1, H_2, \ldots, H_N$.

In one embodiment, the storage node 104 can convert each SA delta update into an SA delta update tuple 202. As shown in FIG. 2*a*, the SA delta update tuple 202 can include several tuple parameters including a logical index (SA-LI) parameter, an entry index (EI) parameter, and a value (V) parameter. It is noted that the SA-LI parameter is a "virtual" logical index, i.e., there is no one-to-one correspondence between the logical index and an address (e.g., logical block address (LBA)) of a physical MD page. The storage node 104 can determine a target bucket $H_1, H_2, \ldots,$ or $H_N$ for an SA delta update in the active set 204 based on a hash of the SA-LI parameter, and write the SA delta update to the determined target bucket $H_1, H_2, \ldots,$ or $H_N$. Further, the storage node 104 can write a copy of the SA delta update tuple 202 to the RDL 210 implemented in the NVRAM 124. In one embodiment, the RDL 210 can be configured as a ring buffer with a head pointer (or "head") 209 and a tail pointer (or "tail") 211. The storage node 104 can write copies of SA delta update tuples to the head 209 of the ring buffer, and release or reclaim allocated space from the tail 211 of the ring buffer. As such, the RDL 210 can be used to store SA delta update tuples in time order (e.g., from oldest to newest).

Once one, some, or all buckets $H_1, H_2, \ldots, H_N$ in the active set 204 are full (or the RDL 210 is full), the storage node 104 can switch the "active" and "de-staging" designations of the first and second sets 204, 206, respectively, and de-stage, merge, and/or aggregate, bucket-by-bucket, the SA delta updates from the newly designated "de-staging" set with any SA delta updates in the base set 208. Further, while the de-staging, merging, and/or aggregating of SA delta updates are in-progress, the storage node 104 can write copies of the aggregated SA delta updates to an active data segment (or "trunk") 212 stored on a storage device of the storage array 106. In one embodiment, the active trunk 212, which contains SA delta update information currently being de-staged, merged, and/or aggregated, can be stored to an SSD tier of the storage array 106. Upon completion of the de-staging, merging, and/or aggregating of SA delta updates, the storage node 104 can maintain copies of the aggregated SA delta updates in a static (or "frozen") trunk 214 stored on a storage device of the storage array 106. Like the active trunk 212, the frozen trunk 214, which contains SA delta update information previously fully de-staged, merged, and/ or aggregated, can also be stored to the SSD tier of the storage array 106. To that end, the storage node 104 can simply switch the "active" and "frozen" designations of the two trunks 212, 214, respectively.

Figure 2B:
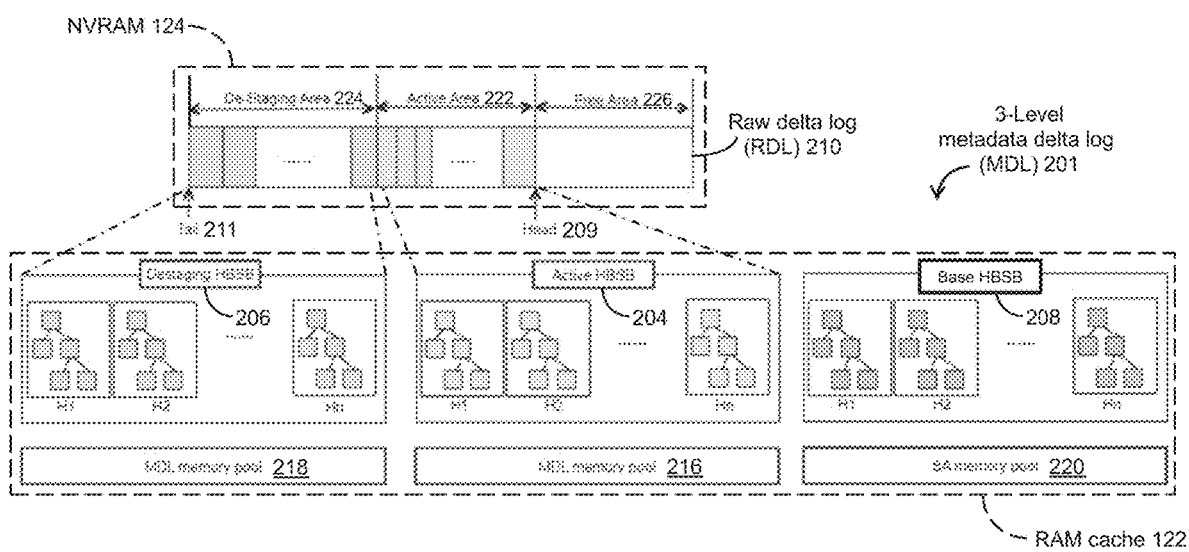

FIG. 2b depicts the 3-level MDL 201 implemented in the RAM cache 122 of FIG. 2a, as well as the RDL 210 implemented in the NVRAM 124 of FIG. 2a. As described herein, the storage node 104 can write SA delta updates to target buckets $H_1, H_2, \ldots, H_N$ in the active set 204 of the 3-level MDL 201, write copies of corresponding SA delta update tuples to the head 209 of the RDL 210 (e.g., a ring buffer), and release or reclaim allocated space from the tail 211 of the RDL 210. As shown in FIG. 2b, the copies of SA delta update tuples can be written to the head 209 of the RDL 210 in an active area 222. As described herein, once one, some, or all of the buckets $H_1, H_2, \ldots, H_N$ in the active set 204 are full (or the RDL 210 is full), the storage node 104 can switch the "active" and "de-staging" designations of the first and second sets 204, 206, respectively. As shown in FIG. 2b, the copies of SA delta update tuples corresponding to the SA delta updates from the buckets $H_1, H_2, \ldots, H_N$ in the previously "active" (now "de-staging") set 206 are maintained in a de-staging area 224 of the RDL 210, which can additionally include a free area 226. As such, in the event of a disaster, system panic, data loss, data corruption, power failure, and so on, the storage node 104 can replay the RDL 210 to apply the SA delta update information contained therein to the active and de-staging sets of buckets, thereby recovering them to a consistent state. It is noted that the storage node 104 can maintain separate memory pools 216, 218, 220 for the active, de-staging, and base sets 204, 206, 208 of buckets, respectively.

Figure 3:
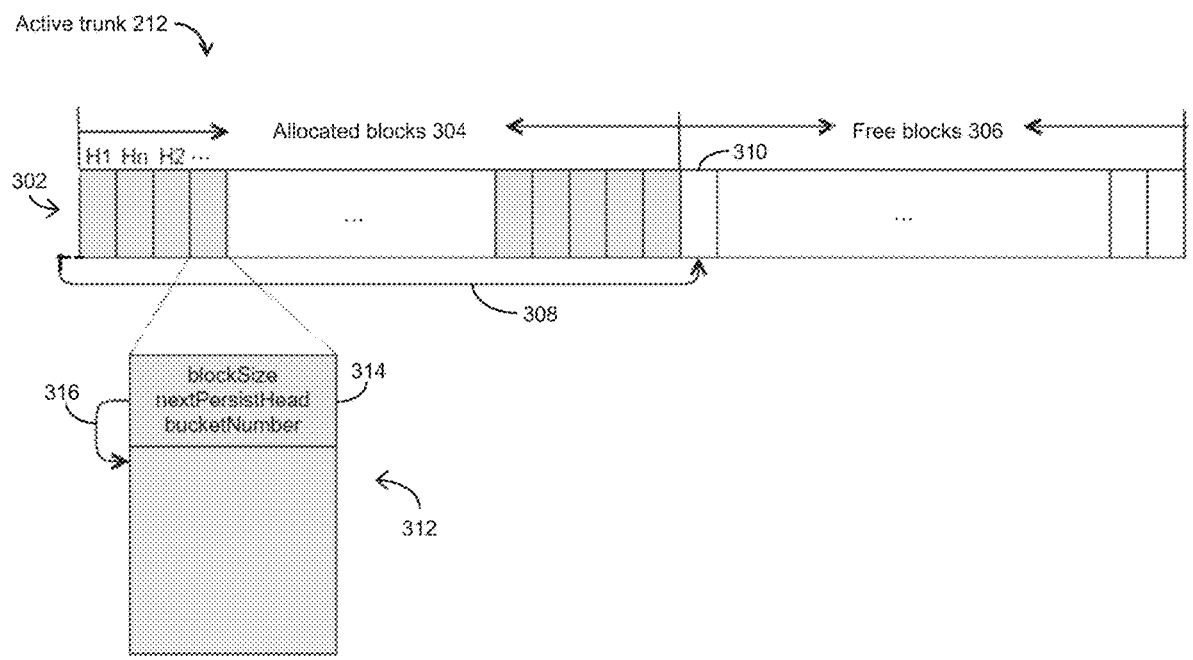
FIG. 3 is a diagram of an exemplary data segment (or "trunk") configured to accommodate a base set of sparse MD updates for storage in a storage device of a storage array in the storage environment of FIG. 1.

FIG. 3 depicts an exemplary format of the active trunk 212 (see FIG. 2a) stored on the storage array 106. It is noted that the frozen trunk 214 (see FIG. 2a) can have a format like that of the active trunk 212 of FIG. 3. As described herein, while the de-staging, merging, and/or aggregating of SA delta updates from the de-staging set 206 to the base set 208 of buckets are in-progress, the storage node 104 can write copies of the aggregated SA delta updates to the active trunk 212. Further, upon completion of the de-staging, merging, and/or aggregating of SA delta updates, the storage node 104 can maintain copies of the aggregated SA delta updates in the frozen trunk 214. In one embodiment, each of the active trunk 212 and the frozen trunk 214 can be configured as a binary large object (BLOB). As shown in FIG. 3, the active trunk 212 can include a storage area for allocated blocks 304, as well as a storage area for free blocks 306. The storage area for the allocated blocks 304 can include a sequence of bucket records 302 for a plurality of buckets (e.g., $H_1, H_n, H_2 \ldots$), each of which can contain SA delta update information from corresponding buckets in the base set 208. In one embodiment, the bucket records 302 can be configured as variable-sized block objects, with no strict ordering of blocks (e.g., according to bucket number 1, 2, ..., n) in the sequence being assumed. The specialized code and data 128 (see FIG. 1) can include a space manager module for managing and allocating blocks from the active trunk 212. For example, the space manager module may be configured to allocate a block 310 pointed to by a head pointer 308 at the beginning of the area for free blocks 306, and to allocate additional blocks by monotonically incrementing the head pointer 308. Further, the space manager module may be configured to allocate a block for each of the plurality of buckets $H_1, H_n, H_2$, and so on, such that no allocated block is shared among any of the respective buckets. As shown in FIG. 3, each block (e.g., a block 312) can have a header 314 that includes the variable block size (blockSize), the corresponding bucket number (1, 2, ..., n), and a head pointer 316 (nextPersistHead) that points to a first next valid entry in the bucket's tree data structure. As described herein, with reference to an illustrative example, the frozen trunk 214 (see FIG. 2a), having a format like that of the active trunk 212 (see FIG. 3), can be used to recover the base set 208 of buckets in the event of a disaster, system panic, data loss, data corruption, power failure, and so on.

Figure 4:
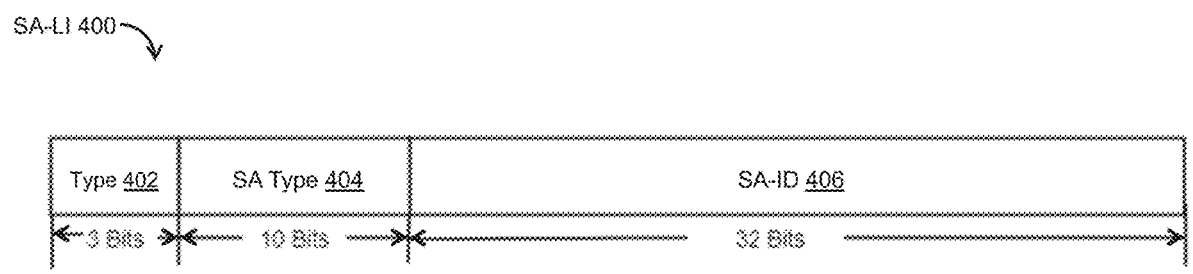
FIG. 4 is a diagram of an exemplary format of a logical index (LI) parameter of an MD delta update tuple.

FIG. 4 depicts an exemplary format of an SA-LI parameter 400 of an SA delta update tuple, such as the SA delta update tuple 202 of FIG. 2a. As shown in FIG. 4, the format of the SA-LI 400 can include a type 402, an SA type 404, and an SA-ID 406. For example, the type 402 may be expressed in three (3) bits, the SA type 404 may be expressed in ten (10) bits, and the SA-ID may be expressed in thirty-two (32) bits. It is noted, however, that any other suitable numbers of bits may be used to express the type 402, the SA type 404, and/or the SA-ID 406. In the format of the SA-LI 400, the type 402 can indicate the type of logical index (LI) (e.g., space accounting (SA)), the SA type 404 can indicate the type of SA statistics (e.g., volume, snapshot, snap group), and the SA-ID 406 can be derived from an identifier (ID) of the corresponding volume, snapshot, snap group, and so on. It is noted that such SA-IDs for SA statistics can be from a large sparse ID space, which can contain many "invalid" (e.g., zero (0)) sparse data values.

During operation, the storage node 104 (see FIG. 1) can collect delta updates of space accounting (SA) statistics (or "SA delta updates") pertaining to space usage on storage devices of the storage array 106, and convert the SA delta updates into SA delta update tuples. In the 3-level MDL 201 (see FIG. 2a), each SA delta update tuple can be received at the active set 204 of buckets $H_1, H_2, \ldots, H_N$ based on a hash of its SA-LI parameter. Further, a copy of each SA delta update tuple can be received and stored at the RDL 210 for recovery purposes. Once one, some, or all buckets of the active set 204 are full (or the RDL 210 is full), the storage node 104 can switch the "active" designation of the active set 204 of buckets with the "de-staging" designation of the de-staging set 206 of buckets in the 3-level MDL 201. The storage node 104 can de-stage, merge, and/or aggregate, bucket-by-bucket, the SA delta update tuples contained in the newly designated "de-staging" set with any SA delta update tuples contained in the base set 208 of buckets in the 3-level MDL 201, while storing copies of the aggregated SA delta update tuples in the active trunk 212 stored on the storage array 106. Upon completion of the de-staging, merging, and/or aggregating of SA delta updates, the storage node 104 can switch the "active" and "frozen" designations of the two trunks 212, 214, respectively, thereby maintaining the copies of the aggregated SA delta update tuples in the newly designated "frozen" trunk for recovery purposes.

Figure 5A:
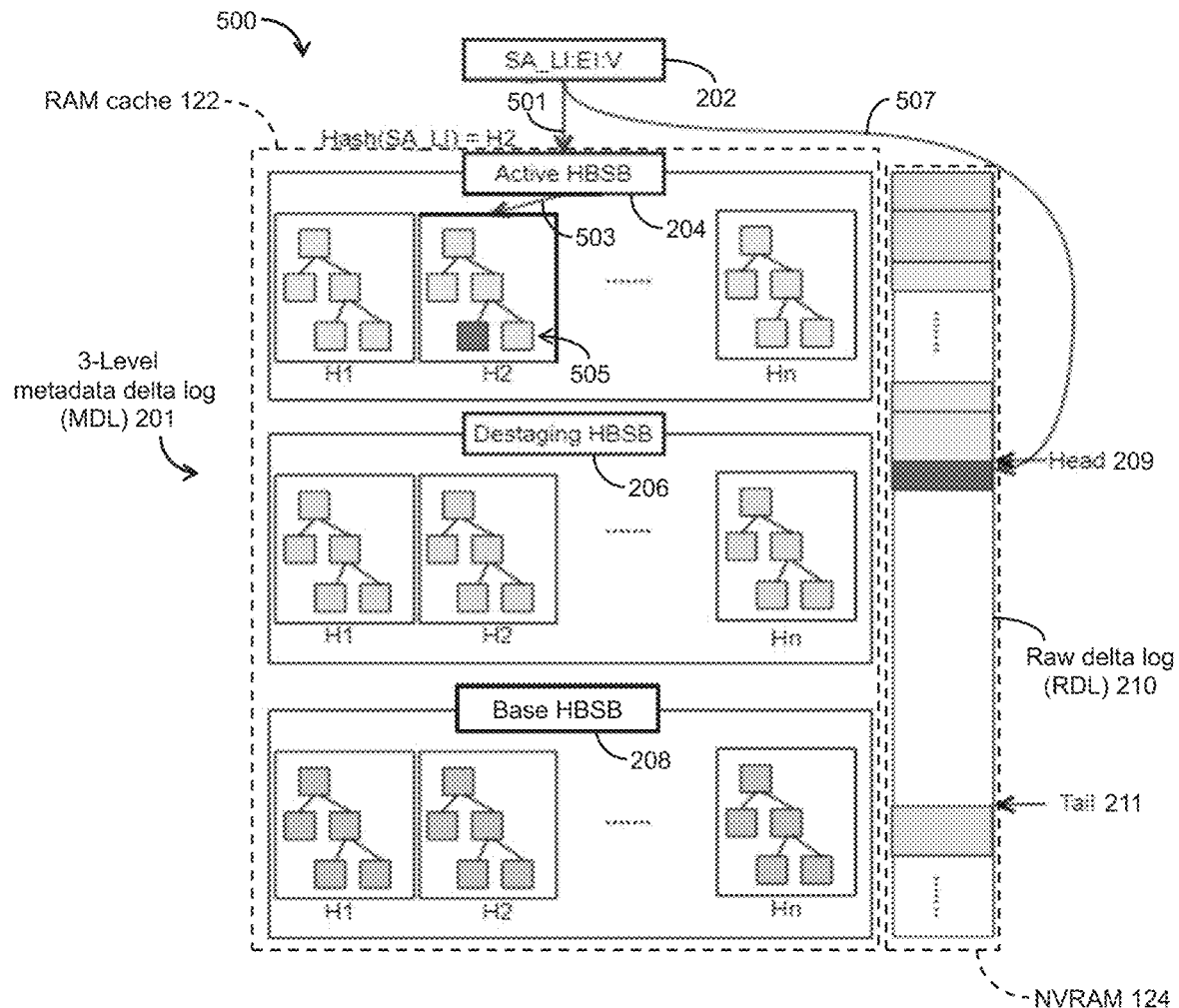
FIG. 5a is a block diagram of an exemplary workflow for receiving sparse MD delta updates, using the delta log-based architecture of the storage node of FIG. 1.

The disclosed techniques for updating sparse metadata in a metadata delta log (MDL)-based storage system will be further understood with reference to the following illustrative examples and FIGS. 5a-5d. FIG. 5a depicts, in a first example, an exemplary workflow 500 for receiving sparse MD delta updates, using the delta log-based architecture of the storage node 104 (see FIG. 1). As shown in FIG. 5a, the delta log-based architecture of the storage node 104 includes the 3-level MDL 201 implemented in the RAM cache 122, and the RDL 210 implemented in the NVRAM 124. In this first example, having collected SA delta updates pertaining to space usage on storage devices of the storage array 106, the storage node 104 converts each SA delta update into an SA delta update tuple, such as the SA delta update tuple 202. As shown in FIG. 5a, the SA delta update tuple 202 includes the three (3) tuple parameters, namely, the logical index (SA-LI) parameter, the entry index (EI) parameter, and the value (V) parameter. The storage node 104 determines a target bucket $H_1, H_2, \ldots,$ or $H_N$ for the SA delta update in the active set 204 based on a hash of the SA-LI parameter. In this first example, the hash of the SA-LI parameter ("Hash (SA-LI)") produces a hash value that specifies the target bucket, "$H_2$", in the active set 204. The storage node 104 provides, over a path 501, the SA delta update to the active set 204 of buckets $H_1, H_2, \ldots, H_N$, and stores, over a path 503, the SA delta update in the target bucket, $H_2$, at a leaf level 505 of the corresponding b-tree. In addition, the storage node 104 writes, over a path 507, a copy of the SA delta update tuple 202 to the head 209 of the RDL 210 (e.g., ring buffer), and releases or reclaims allocated space from the tail 211 of the RDL 210.

Figure 5B:
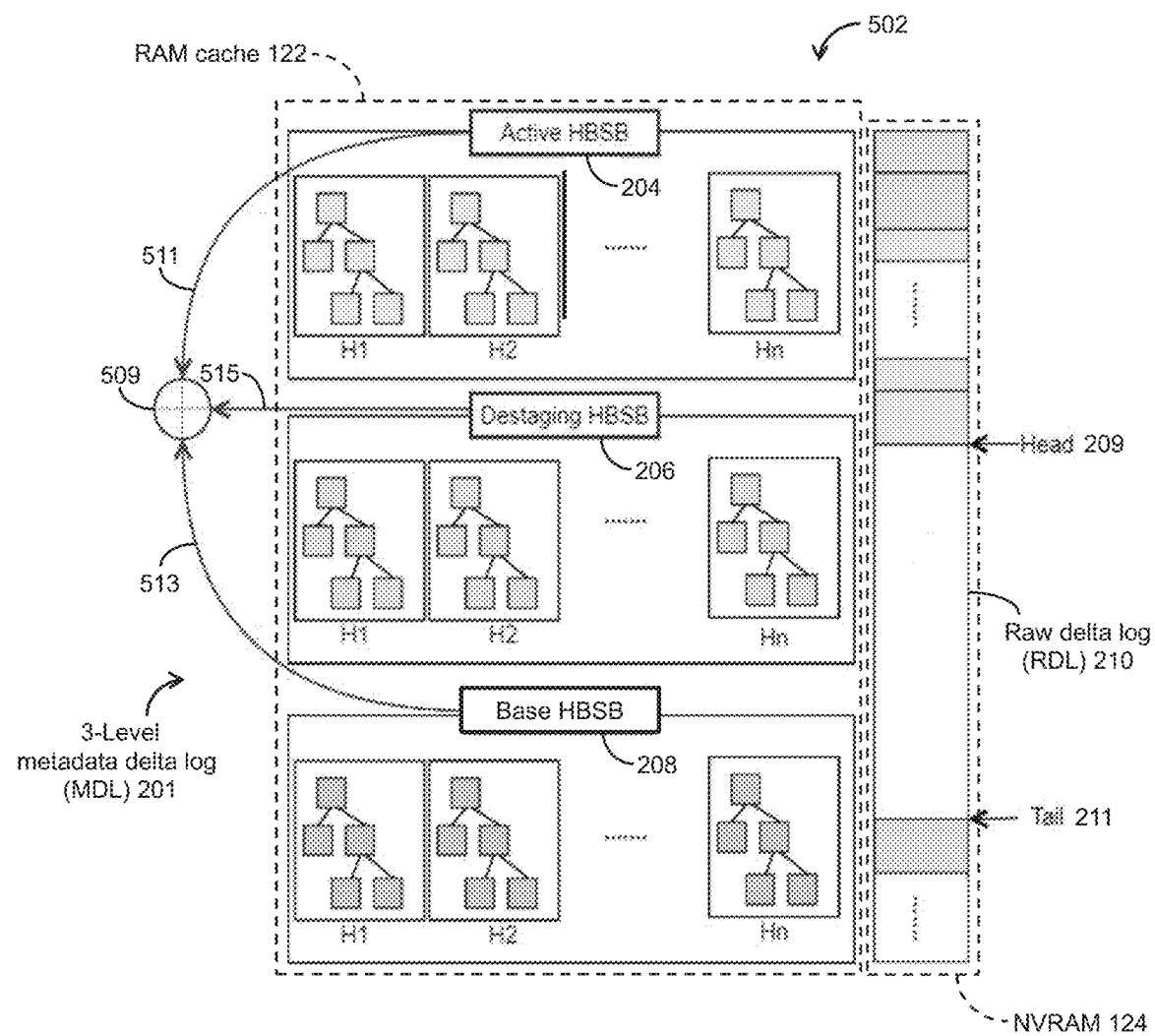
FIG. 5b is a block diagram of an exemplary workflow for reading sparse MD deltas, using the delta log-based architecture of the storage node of FIG. 1.

FIG. 5b depicts, in a second example, an exemplary workflow 502 for reading sparse MD deltas, using the delta log-based architecture of the storage node of FIG. 1. As shown in FIG. 5b, the delta log-based architecture of the storage node 104 includes an SA data merge functionality 509, which can be implemented by the storage node's specialized code and data 128 (see FIG. 1). As described herein, the storage clients 102.1 ..., 102.n (see FIG. 1) refer to SA delta updates stored at the storage node 104 to determine needs to extend, release, or reclaim storage space, thereby assuring an availability of the storage node 104. In this second example, techniques employed by the storage node 104 to read the stored SA delta updates are dependent, at least in part, on whether or not SA delta updates contained in the de-staging set 206 of buckets $H_1, H_2, \ldots, H_N$ have previously been fully or completely merged with SA delta updates contained in the base set 208 of buckets $H_1, H_2, \ldots, H_N$. If the SA delta updates contained in the de-staging set 206 have previously been fully or completely merged with the SA delta updates contained in the base set 208, then the storage node 104 provides, over a path 511, SA delta updates contained in the active set 204 of buckets $H_1, H_2, \ldots, H_N$ to the SA data merge functionality 509, provides, over a path 513, the SA delta updates contained in the base set 208 of buckets $H_1, H_2, \ldots, H_N$ to the SA data merge functionality 509, executes the SA data merge functionality 509 to merge, bucket-by-bucket, the SA delta updates from the active set 204 with the SA delta updates from the base set 208, and reads the resulting merged SA delta update information. Otherwise, if the SA delta updates contained in the de-staging set 206 have not previously been fully or completely merged with the SA delta updates contained in the base set 208, then the storage node 104 further provides, over a path 515, the SA delta updates contained in the de-staging set 206 of buckets $H_1, H_2, \ldots, H_N$ to the SA data merge functionality 509, executes the SA data merge functionality 509 to merge, bucket-by-bucket, the SA delta updates from the de-staging set 206 with the SA delta updates from the base set 208, executes the SA data merge functionality 509 to merge, bucket-by-bucket, the SA delta updates from the active set 204 with the merged SA delta updates from the de-staging and base sets 206, 208, and reads the resulting merged SA delta update information.

Figure 5C:
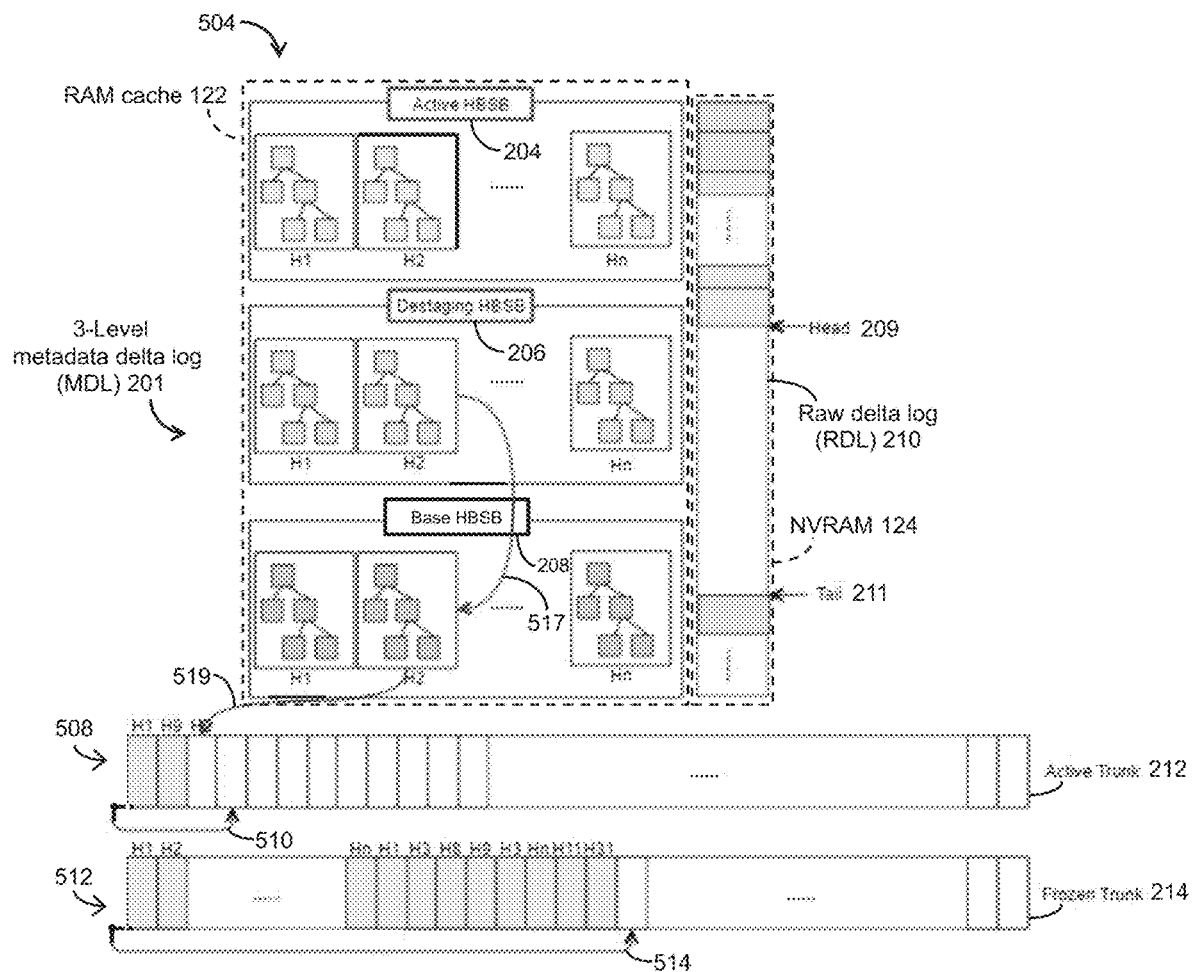
FIG. 5c is a block diagram of an exemplary workflow for de-staging sparse MD delta updates, using the delta log-based architecture of the storage node of FIG. 1.

FIG. 5c depicts, in a third example, an exemplary workflow 504 for de-staging sparse MD delta updates, using the delta log-based architecture of the storage node of FIG. 1. As shown in FIG. 5c, the delta log-based architecture of the storage node 104 includes the active trunk 212 stored on a storage device of the storage array 106, as well as the frozen trunk 214 stored on a storage device of the storage array 106. In this third example, the active trunk 212 includes a storage area for allocated blocks, which includes a sequence of bucket records 508 for a plurality of buckets (e.g., $H_1, H_9, H_2$). It is noted that no strict ordering of blocks (e.g., according to bucket number 1, 2, ..., n) in the sequence of bucket records 508 is assumed. The active trunk 212 also includes a storage area for free blocks. The space manager module implemented by the storage node's specialized code and data 128 (see FIG. 1) allocates a free block pointed to by a head pointer 510 at the beginning of the free block storage area. Further, in this third example, the frozen trunk 214 includes a storage area for allocated blocks, which includes a sequence of bucket records 512 for a plurality of buckets (e.g., $H_1, H_2, \ldots, H_n, H_1, H_3, H_8, H_9, H_3, H_n, H_{11}, H_{31}$). Again, no strict ordering of blocks (e.g., according to bucket number 1, 2, ..., n) in the sequence of bucket records 512 is assumed. The frozen trunk 214 also includes a storage area for free blocks. The space manager module allocates a free block pointed to by a head pointer 514 at the beginning of the free block storage area. As described herein, once one, some, or all buckets $H_1, H_2, \ldots,$ and/or $H_N$ in the active set 204 are full (or the RDL 210 is full), the storage node 104 switches the "active" and "de-staging" designations of the first and second sets 204, 206, respectively, and de-stages, merges, and/or aggregates, bucket-by-bucket, the SA delta updates from the newly designated "de-staging" level with the SA delta updates in the base set 208. As shown in FIG. 5c, with reference to the buckets "$H_2$" in the de-staging and base sets 206, 208, the storage node 104 de-stages, merges, and/or aggregates, over a path 517, the SA delta updates from the bucket, $H_2$, in the de-staging set 206 with the SA delta updates of the bucket, $H_2$, in the base set 208. Further, while the de-staging, merging, and/or aggregating of SA delta updates for the bucket, $H_2$, are in-progress, the storage node 104 writes, over a path 519, copies of the aggregated SA delta updates to a record for the bucket, $H_2$, in the active trunk 212, while removing any invalid entries in the sparse SA metadata. In likewise fashion, SA delta updates from the buckets $H_1, H_3, \ldots, H_n$ in the de-staging set 206 are de-staged, merged, and/or aggregated with SA delta updates from the buckets $H_1, H_3, \ldots, H_n$ in the base set 208, respectively, and copies of the aggregated SA delta updates are written to records for the respective buckets $H_1, H_3, \ldots, H_n$ in the active trunk 212, while any invalid entries in the sparse SA metadata are removed. Upon completion of the de-staging, merging, and/or aggregating of SA delta updates, the SA delta update information contained in the active trunk 212 represents a current state of the de-staging set 206 of buckets $H_1, H_3, \ldots, H_n$. The storage node 104 switches the "active" and "frozen" designations of the two trunks 212, 214, respectively, to maintain copies of the aggregated SA delta updates in the newly designated "frozen" trunk on the storage array 106. In addition, the storage node 104 clears the entire de-staging memory pool 218, and releases or reclaims allocated space from the tail 211 of the RDL 210.

Figure 5D:
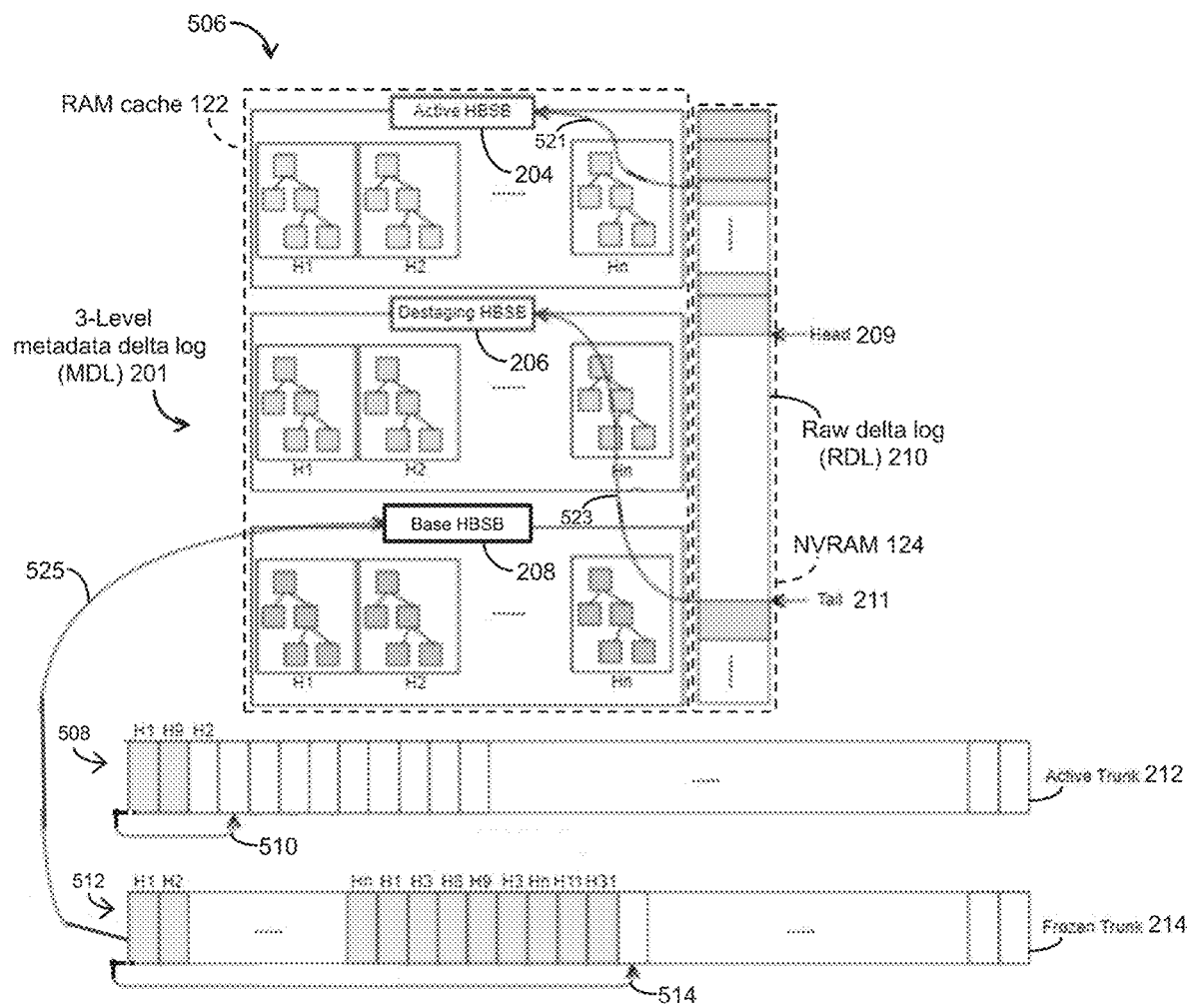

FIG. 5d depicts, in a fourth example, an exemplary workflow 506 for performing a recovery of the 3-level MDL 201 from a disaster, system panic, data loss, data corruption, power failure, and so on. As described herein, copies of SA delta update tuples written to the buckets $H_1, H_2, \ldots, H_N$ in the active set 204 are written to the head 209 of the RDL 210 in the active area 222 (see FIG. 2b), and copies of SA delta update tuples from buckets $H_1, H_2, \ldots, H_N$ in a previously "active" (now "de-staging") set are maintained in the de-staging area 224 (see FIG. 2b) of the RDL 210. In this fourth example, in the event of a disaster, system panic, data loss, data corruption, power failure, and so on, the storage node 104 rebuilds or reconstructs SA delta update information in the 3-level MDL 201 by replaying the RDL 210, thereby applying, over a path 521, the SA delta update information from the active area 222 of the RDL 210 to the active set 204 of buckets $H_1, H_2, \ldots, H_N$, and applying, over a path 523, the SA delta update information from the de-staging area 222 of the RDL 210 to the de-staging set 206 of buckets $H_1, H_2, \ldots, H_N$. In addition, the storage node 104 applies, over a path 525, the SA delta update information from the frozen trunk 214 to the base set 208 of buckets $H_1, H_2, \ldots, H_N$. Once the SA delta update information has been rebuilt or reconstructed in the 3-level MDL 201, the storage node 104 can restart, from the beginning, a process of de-staging the SA delta updates from the de-staging set 206 of buckets $H_1, H_2, \ldots, H_N$ to the base set 208 of buckets $H_1, H_2, \ldots, H_N$.

Figure 6:
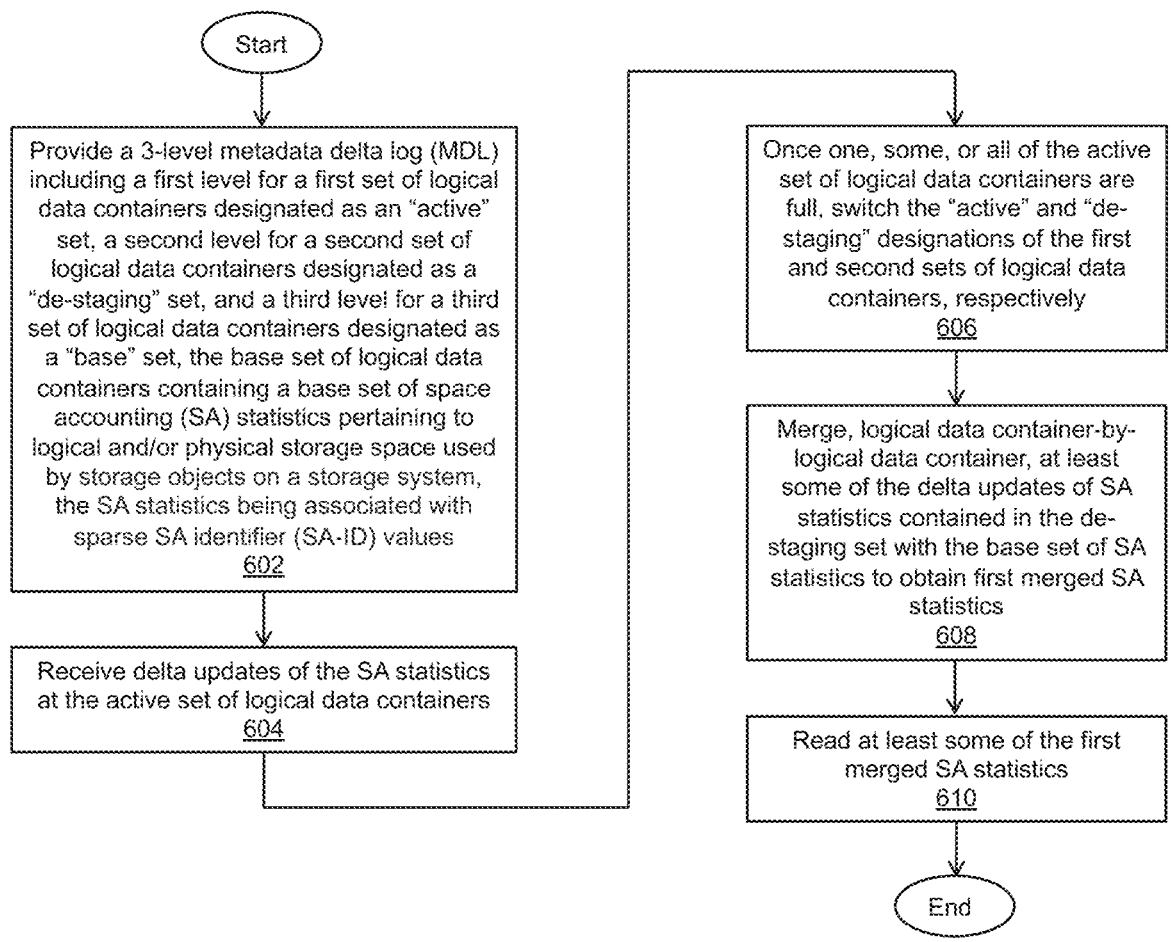
FIG. 6 is a flow diagram of an exemplary method of performing sparse metadata updates in an MDL-based storage system.

A method of updating sparse metadata in a metadata delta log (MDL)-based storage system is described below with reference to FIG. 6. As depicted in block 602, a 3-level metadata delta log (MDL) is provided, including a first level for a first set of logical data containers designated as an "active" set, a second level for a second set of logical data containers designated as a "de-staging" set, and a third level for a third set of logical data containers designated as a "base" set, the base set of logical data containers containing a base set of space accounting (SA) statistics pertaining to logical and/or physical storage space used by storage objects on a storage system, and the SA statistics being associated with sparse SA identifier (SA-ID) values. As depicted in block 604, delta updates of the SA statistics are received at the active set of logical data containers. As depicted in block 606, once one, some, or all of the active set of logical data containers are full, the "active" and "de-staging" designations of the first and second sets of logical data containers, respectively, are switched. As depicted in block 608, at least some of the delta updates of SA statistics contained in the de-staging set are merged, logical data container-by-logical data container, with the base set of SA statistics to obtain first merged SA statistics. As depicted in block 610, at least some of the first merged SA statistics are read. By providing the 3-level MDL for logging delta updates of SA statistics associated with sparse SA-ID values, the updating of sparse SA statistics can be performed with increased efficiency, using reduced amounts of processing and memory resources.

Having described the above illustrative embodiments, various alternative embodiments and/or variations may be made and/or practiced. For example, with reference to the workflow 506 (see FIG. 5d), it was described that, once SA delta update information has been rebuilt or reconstructed in the 3-level MDL 201, the storage node 104 can restart, from the beginning, an entire process of de-staging SA delta updates from the de-staging set 206 of buckets $H_1, H_2, \ldots, H_N$ to the base set 208 of buckets $H_1, H_2, \ldots, H_N$. In one embodiment, to avoid having to restart the entire de-staging process from the beginning, the storage node 104 can maintain metadata information (e.g., a "bookmark") that indicates a point in the de-staging set 206 where SA delta updates from the last bucket were de-staged before the occurrence of a disaster, system panic, data loss, data corruption, power failure, and so on. As a result, rather than restarting the entire process of de-staging SA delta updates from the beginning, the storage node 104 can de-stage SA delta updates from the de-staging set 206 of buckets up to the point indicated by the bookmark, and recover SA delta update information for the remaining buckets in the base set 208 from the frozen chunk 214.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid-state drives (SSDs), flash devices (e.g., NAND flash devices, NOR flash devices), and/or similar devices that may be accessed locally and/or remotely, such as via a storage area network (SAN).

As employed herein, the term "storage array" may refer to a storage system used for block-based, file-based, or other object-based storage. Such a storage array may include, for example, dedicated storage hardware containing HDDs, SSDs, and/or all-flash drives.

As employed herein, the term "storage entity" may refer to a filesystem, an object storage, a virtualized device, a logical unit (LU), a logical volume (LV), a logical device, a physical device, and/or a storage medium.

As employed herein, the term "LU" may refer to a logical entity provided by a storage system for accessing data from the storage system and may be used interchangeably with a logical volume (LV). The term "LUN" may refer to a logical unit number for identifying a logical unit, a virtual disk, or a virtual LUN.

As employed herein, the term "physical storage unit" may refer to a physical entity such as a storage drive or disk or an array of storage drives or disks for storing data in storage locations accessible at addresses. The term "physical storage unit" may be used interchangeably with the term "physical volume."

As employed herein, the term "storage medium" may refer to a hard drive or flash storage, a combination of hard drives and flash storage, a combination of hard drives, flash storage, and other storage drives or devices, or any other suitable types and/or combinations of computer readable storage media. Such a storage medium may include physical and logical storage media, multiple levels of virtual-to-physical mappings, and/or disk images. The term "storage medium" may also refer to a computer-readable program medium.

As employed herein, the term "IO request" or "IO" may refer to a data input or output request such as a read request or a write request.

As employed herein, the terms, "such as," "for example," "e.g.," "exemplary," and variants thereof refer to non-limiting embodiments and have meanings of serving as examples, instances, or illustrations. Any embodiments described herein using such phrases and/or variants are not necessarily to be construed as preferred or more advantageous over other embodiments, and/or to exclude incorporation of features from other embodiments.

As employed herein, the term "optionally" has a meaning that a feature, element, process, etc., may be provided in certain embodiments and may not be provided in certain other embodiments. Any particular embodiment of the present disclosure may include a plurality of optional features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method comprising:
   providing a 3-level metadata delta log (MDL) including a first level for a first set of logical data containers designated as an "active" set, a second level for a second set of logical data containers designated as a "de-staging" set, and a third level for a third set of logical data containers designated as a "base" set, the base set of logical data containers containing a base set of space accounting (SA) statistics pertaining to logical and/or physical storage space used by storage objects on a storage system, the SA statistics being associated with sparse SA identifier (SA-ID) values;
   receiving delta updates of the SA statistics at the active set of logical data containers;
   once one, some, or all of the active set of logical data containers are full, switching the "active" and "de-staging" designations of the first and second sets of logical data containers, respectively;
   merging, logical data container-by-logical data container, at least some of the delta updates of SA statistics contained in the de-staging set with the base set of SA statistics to obtain first merged SA statistics; and
   reading at least some of the first merged SA statistics.

2. The method of claim 1 further comprising:
   determining that the delta updates of SA statistics contained in the de-staging set have been fully or completely merged with the base set of SA statistics;
   merging, logical data container-by-logical data container, the delta updates of SA statistics contained in the active set with the first merged SA statistics to obtain second merged SA statistics; and
   reading at least some of the second merged SA statistics.

3. The method of claim 1 further comprising:
   determining that one or more delta updates of SA statistics contained in the de-staging set have not been merged with the base set of SA statistics;
   merging, logical data container-by-logical data container, the one or more delta updates of SA statistics contained in the de-staging set with the first merged SA statistics to obtain second merged SA statistics;
   merging, logical data container-by-logical data container, the delta updates of SA statistics contained in the active set with the second merged SA statistics to obtain third merged SA statistics; and
   reading at least some of the third merged SA statistics.

4. The method of claim 1 further comprising:
   writing copies of the delta updates of the SA statistics received at the active set of logical data containers to an active area of a raw delta log (RDL) in persistent memory, the RDL including a de-staging area containing copies of delta updates of SA statistics contained in the de-staging set of logical data containers.

5. The method of claim 4 further comprising:
   in response to a predetermined event, reconstructing the delta updates of the SA statistics contained in the active set of logical data containers by applying the copies of the delta updates of the SA statistics from the active area of the RDL to the active set of logical data containers.

6. The method of claim 5 further comprising:
   in response to the predetermined event, reconstructing the delta updates of the SA statistics contained in the de-staging set of logical data containers by applying the copies of the delta updates of the SA statistics from the de-staging area of the RDL to the de-staging set of logical data containers.

7. The method of claim 6 further comprising:
   maintaining copies of the base set of SA statistics contained in the base set of logical data containers in a sequence of records stored in a persistent data segment.

8. The method of claim 7 further comprising:
   in response to the predetermined event, reconstructing the base set of SA statistics by applying the copies of the base set of SA statistics from the sequence of records in the persistent data segment to the base set of logical data containers.

9. The method of claim 8 further comprising:
   maintaining metadata information indicating a point in the de-staging set where delta updates of SA statistics from a last logical data container were merged with the base set of SA statistics before the predetermined event; and
   having reconstructed the delta updates of the SA statistics contained in the de-staging set of logical data containers, de-staging, logical data container-by-logical data container, the reconstructed delta updates of SA statistics from the de-staging set to the base set up to the point indicated by the metadata information; and
   recovering SA statistics for remaining logical data containers in the base set from the sequence of records in the persistent data segment.

10. A system comprising:
a 3-level metadata delta log (MDL), the 3-level MDL including a first level for a first set of logical data containers designated as an "active" set, a second level for a second set of logical data containers designated as a "de-staging" set, and a third level for a third set of logical data containers designated as a "base" set,
wherein the base set of logical data containers contains a base set of space accounting (SA) statistics pertaining to logical and/or physical storage space used by storage objects on a storage system, and
wherein the SA statistics are associated with sparse SA identifier (SA-ID) values;
a memory; and
processing circuitry configured to execute program instructions out of the memory to:
receive delta updates of the SA statistics at the active set of logical data containers;
once one, some, or all of the active set of logical data containers are full, switch the "active" and "de-staging" designations of the first and second sets of logical data containers, respectively;
merge, logical data container-by-logical data container, at least some of the delta updates of SA statistics contained in the de-staging set with the base set of SA statistics to obtain first merged SA statistics; and
read at least some of the first merged SA statistics.

11. The system of claim 10 wherein the processing circuitry is configured to execute the program instructions out of the memory to:
determine that the delta updates of SA statistics contained in the de-staging set have been fully or completely merged with the base set of SA statistics;
merge, logical data container-by-logical data container, the delta updates of SA statistics contained in the active set with the first merged SA statistics to obtain second merged SA statistics; and
read at least some of the second merged SA statistics.

12. The system of claim 10 wherein the processing circuitry is configured to execute the program instructions out of the memory to:
determine that one or more delta updates of SA statistics contained in the de-staging set have not been merged with the base set of SA statistics;
merge, logical data container-by-logical data container, the one or more delta updates of SA statistics contained in the de-staging set with the first merged SA statistics to obtain second merged SA statistics;
merge, logical data container-by-logical data container, the delta updates of SA statistics contained in the active set with the second merged SA statistics to obtain third merged SA statistics; and
read at least some of the third merged SA statistics.

13. The system of claim 10 wherein the processing circuitry is configured to execute the program instructions out of the memory to write copies of the delta updates of the SA statistics received at the active set of logical data containers to an active area of a raw delta log (RDL) in persistent memory,
wherein the RDL includes a de-staging area containing copies of delta updates of SA statistics contained in the de-staging set of logical data containers.

14. The system of claim 13 wherein the processing circuitry is configured to execute the program instructions out of the memory to, in response to a predetermined event, reconstruct the delta updates of the SA statistics contained in the active set of logical data containers by applying the copies of the delta updates of the SA statistics from the active area of the RDL to the active set of logical data containers.

15. The system of claim 14 wherein the processing circuitry is configured to execute the program instructions out of the memory to, in response to the predetermined event, reconstruct the delta updates of the SA statistics contained in the de-staging set of logical data containers by applying the copies of the delta updates of the SA statistics from the de-staging area of the RDL to the de-staging set of logical data containers.

16. The system of claim 10 wherein the processing circuitry is configured to execute the program instructions out of the memory to maintain copies of the base set of SA statistics contained in the base set of logical data containers in a sequence of records stored in a persistent data segment.

17. The system of claim 16 wherein the processing circuitry is configured to execute the program instructions out of the memory to, in response to a predetermined event, reconstruct the base set of SA statistics by applying the copies of the base set of SA statistics from the sequence of records in the persistent data segment to the base set of logical data containers.

18. The system of claim 10 wherein each of the sparse SA-ID values is configured to identify a respective one of the storage objects on the storage system.

19. A computer program product including a set of non-transitory, computer-readable media having instructions that, when executed by processing circuitry, cause the processing circuitry to perform a method comprising:
providing a 3-level metadata delta log (MDL) including a first level for a first set of logical data containers designated as an "active" set, a second level for a second set of logical data containers designated as a "de-staging" set, and a third level for a third set of logical data containers designated as a "base" set, the base set of logical data containers containing a base set of space accounting (SA) statistics pertaining to logical and/or physical storage space used by storage objects on a storage system, the SA statistics being associated with sparse SA identifier (SA-ID) values;
receiving delta updates of the SA statistics at the active set of logical data containers;
once one, some, or all of the active set of logical data containers are full, switching the "active" and "de-staging" designations of the first and second sets of logical data containers, respectively;
merging, logical data container-by-logical data container, at least some of the delta updates of SA statistics contained in the de-staging set with the base set of SA statistics to obtain first merged SA statistics; and
reading at least some of the first merged SA statistics.

20. The computer program product of claim 19 wherein the method comprises:
determining whether or not the delta updates of SA statistics contained in the de-staging set have been fully or completely merged with the base set of SA statistics;
in response to the delta updates of SA statistics contained in the de-staging set having been fully or completely merged with the base set of SA statistics:
merging, logical data container-by-logical data container, the delta updates of SA statistics contained in the active set with the first merged SA statistics to obtain second merged SA statistics; and
reading at least some of the second merged SA statistics; and in response to one or more delta updates of SA statistics contained in the de-staging set not having been merged with the base set of SA statistics:
  merging, logical data container-by-logical data container, the one or more delta updates of SA statistics contained in the de-staging set with the first merged SA statistics to obtain second merged SA statistics;
  merging, logical data container-by-logical data container, the delta updates of SA statistics contained in the active set with the second merged SA statistics to obtain third merged SA statistics; and
reading at least some of the third merged SA statistics.

\* \* \* \* \*